United States Patent [19]
Villa

[11] Patent Number: 4,569,208
[45] Date of Patent: Feb. 11, 1986

[54] PRESSURE RELIEF PORT

[75] Inventor: Joseph Villa, Hazlet, N.J.

[73] Assignee: Buildex Incorporated, Jericho, N.Y.

[21] Appl. No.: 679,197

[22] Filed: Dec. 7, 1984

[51] Int. Cl.[4] .............................................. F25D 23/06
[52] U.S. Cl. ........................................ 62/273; 62/404;
      98/87; 137/526; 137/855
[58] Field of Search .................... 137/341, 526, 855;
      62/441, 447, 186, 189, 404, 273; 98/87

[56] References Cited

U.S. PATENT DOCUMENTS

| | | | |
|---|---|---|---|
| 3,167,931 | 2/1965 | Bryson | 62/404 X |
| 3,807,444 | 4/1974 | Fortune | 137/855 X |
| 4,257,445 | 3/1981 | Cook et al. | 137/526 X |

*Primary Examiner*—Lloyd L. King
*Attorney, Agent, or Firm*—Blum Kaplan Friedman Silberman & Beran

[57] ABSTRACT

A pressure relief port for relieving the pressure within an enclosure having a wall with first and second sides and a first opening therethrough. The pressure relief port includes a tube having a conduit therethrough sized to fit in the first opening in the wall to extend essentially intermediate the first and second sides of the wall. First and second end caps having respective openings therein are sized to fit on the first and second walls respectively, about the first opening. The tube extends into the first and second end caps. A flexible diaphragm extends substantially across the conduit in the tube for regulating air flow and is displaceable between a first position where the diaphragm substantially closes off the conduit to air flow and a second position where the diaphragm is displaced by air pressure to permit air to flow through the conduit to equalize pressure on opposite sides of the wall.

10 Claims, 4 Drawing Figures

PRESSURE RELIEF PORT

BACKGROUND OF THE INVENTION

The present invention relates to a pressure relief port which regulates the pressure within an enclosure and, in particular, to a miniature pressure relief port preferably for use in regulating the pressure within commercial refrigeration enclosures.

A commercial refrigeration enclosure generally includes a sealed room with a door which can be opened and closed. Opening and closing of the door of commercial refrigeration equipment can cause a substantial and undesired change in pressure within the enclosure. Thus, where the door closes inwardly towards the enclosure, an indesirable build-up of pressure within the enclosure will be created. It is therefore necessary to provide for equalization of the pressure on opposite sides of the refrigeration enclosure while preventing random flow of air therebetween which would have an adverse effect on refrigeration.

A mere opening or vent port in the wall of such an enclosure is insufficient since there will be random flow of air therein, transfer of heat therethrough and potential frost built-up. Accordingly, there have been various proposals for vent ports which are somewhat complicated in structure and generally expensive to manufacture. One type of shielded vent port of the type under discussion is disclosed in U.S. Pat No. 4,257,445 issued on Mar. 24, 1981.

Accordingly, it is desired to provide an improved pressure relief port designed especially for use in commercial refrigeration equipment of the "reach in" type where the opening and closing of a door on the refrigeration enclosure causes a change of pressure within the enclosure.

SUMMARY OF THE INVENTION

Generally speaking, in accordance with the present invention, a pressure relief port for relieving the pressure within an enclosure having a wall with first and second sides and a first opening therethrough, is provided. The pressure relief port includes a tube having a conduit therethrough which is sized to fit in the first opening in the wall to extend essentially intermediate the first and second sides of the wall. A first end cap having a second opening sized to fit on the first wall about the first opening, and a second end cap having a third opening size to fit on the second wall about the first opening, are provided. The tube extends into the first and second end caps. A flexible diaphragm extends substantially across the conduit in the tube for regulating the air flow. The flexible diaphragm is displaceable between a first position where the diaphragm substantially closes off the conduit to air flow and a second position where the diaphragm is displaced by air pressure to permit air to flow through the conduit whereby pressure on opposite sides of the wall of the enclosure is equalized.

In a preferred embodiment, the diaphragm flap is coupled to a truncated cup inserted in the tube. The end caps may include catches which are adapted to fit several wall thicknesses. Screens are provided over the openings in the end caps to prevent dirt and other impurities from flowing through the tube. In addition, a heater may be provided to heat the tube to prevent frost build-up due to differences in temperature on opposite side of the wall of the enclosure.

Accordingly, it is an object of the present invention to provide an improved pressure relief port.

Another object of the present invention is to provide an improved pressure relief port preferably for use in "reach-in" type refrigeration enclosures.

A further object of the present invention is to provide an improved pressure relief port that is simple in construction and inexpensive to manufacture.

A still further object of the present invention is to provide an improved pressure relief port which is adaptable to fit walls of different sizes.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
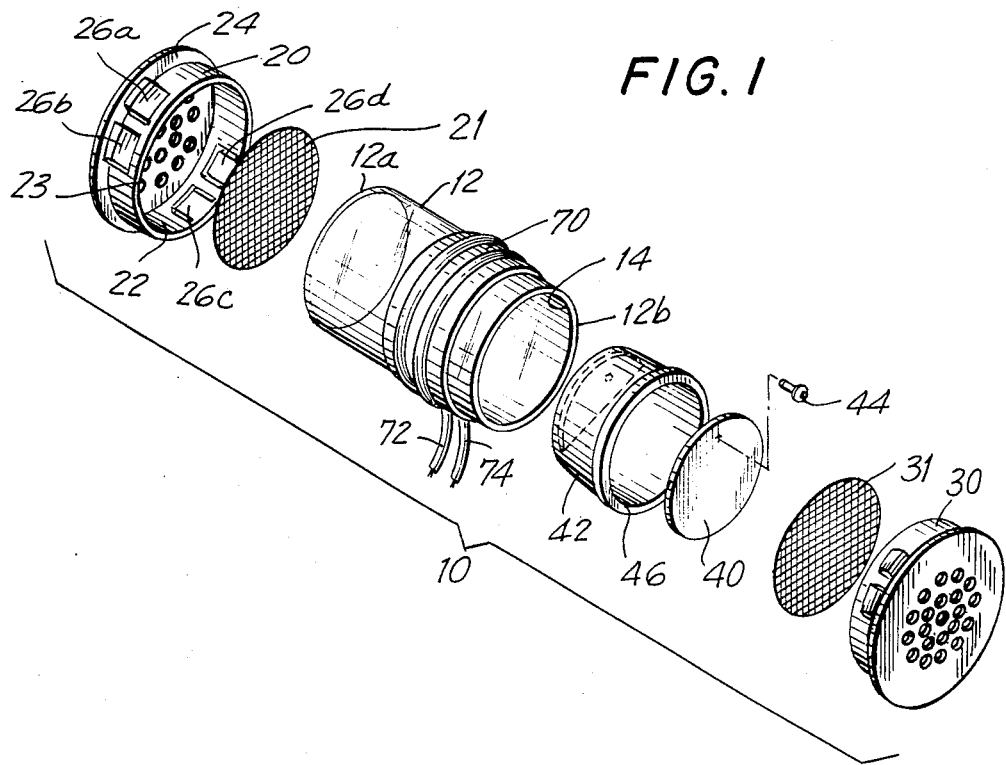
FIG. 1 is an exploded perspective view of a pressure relief port constructed in accordance with a preferred embodiment of the present invention.
Figure 2:
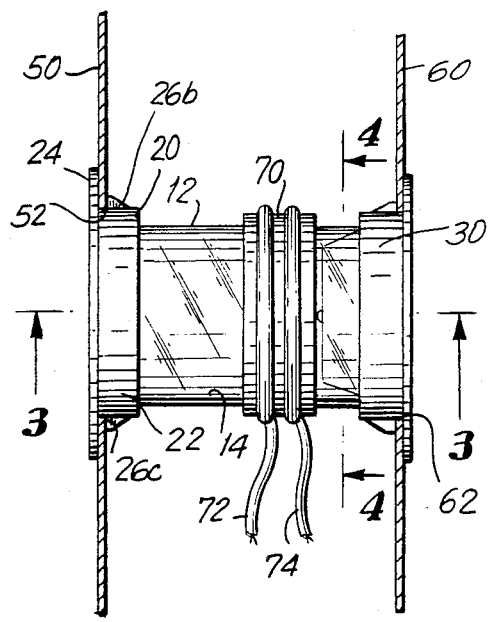
FIG. 2 is a top plan view of the pressure relief port depicted in FIG. 1, shown in place in a wall.
Figure 4:
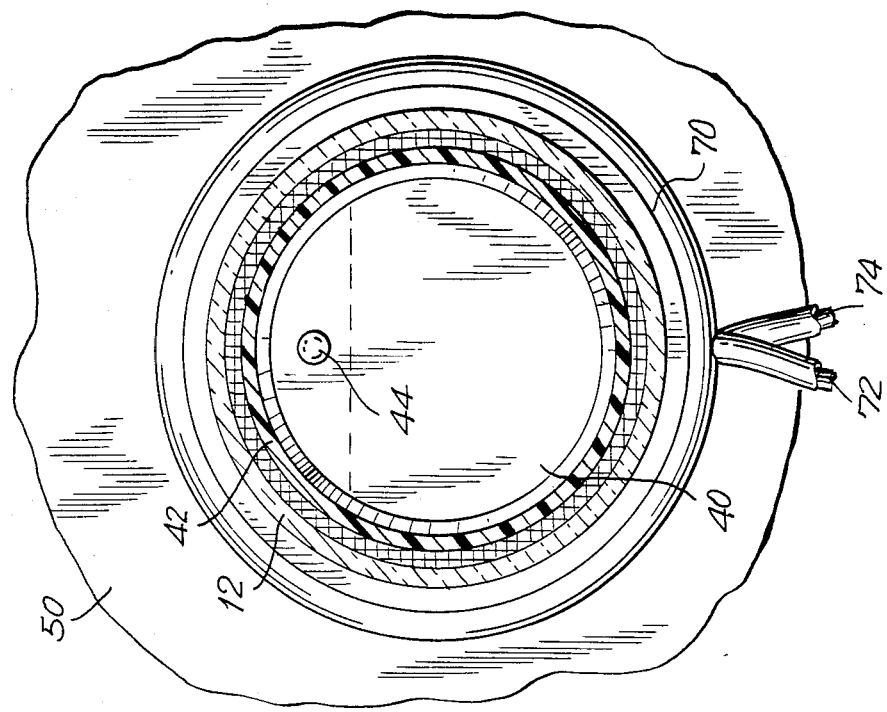
FIG. 4 is an enlarged sectional view taken along line 4—4 of FIG. 2.

Reference is made to the drawings which depict a pressure relief port, generally indicated at 10, constructed in accordance with a preferred embodiment of the present invention. Pressure relief port 10 includes a tube 12 having a conduit 14 therethrough. Pressure relief port 10 also includes first and second end caps 20 and 30, respectively. Tube 12 and end caps 20 and 30 are preferably molded from a rigid plastic material.

End caps 20 and 30 are similarly constructed and, therefore, only the construction of end cap 20 will be described in detail. End cap 20 includes a collar 22 in which a first end 12a of tube 12 can be inserted. End cap 20 also includes a flange 24 which defines an opening 23 and which abuts against a wall 50 of a commercial refrigeration enclosure to prevent end cap 20 from being pushed into an opening 52 provided in wall 20. Wall 50 would face the interior of the refrigeration enclosure, whereas a wall 60 would define the outer surface of the enclosure. Wall 60 also includes an opening 62 so that together walls 50 and 60 define an open path therethrough.

End cap 20 also includes step catches 26a, 26b, 26c and 26d which are adapted to lock end cap 20 against wall 50. Step catches 26a through 26d are variously spaced from flange 24 so that end cap 20 can fit various thicknesses of wall 50. Screens 21 and 31 are sized to fit in end caps 20 and 30 respectively to prevent dirt and other impurities from flowing through tube 12.

A flexible diaphragm flap 40, preferably made of a rubber material is positioned within tube 12 so as to extend across conduit 14 therein. In a preferred embodiment, diaphragm flap 40 is coupled to a truncated cup 42 by means of a rivet or staple 44. Cup 42 is inserted in second end 12b of tube 12 and includes a flange 46 which abuts against end 12b of tube 12 to prevent cup 42 from being pushed further in conduit 14. In this fashion, air flowing through tube 12 must flow through cup 42 past diaphragm flap 40. Since diaphragm flap 40 essentially closes off cup 42 in a first rest position, air will normally not flow therethrough.

Figure 3:
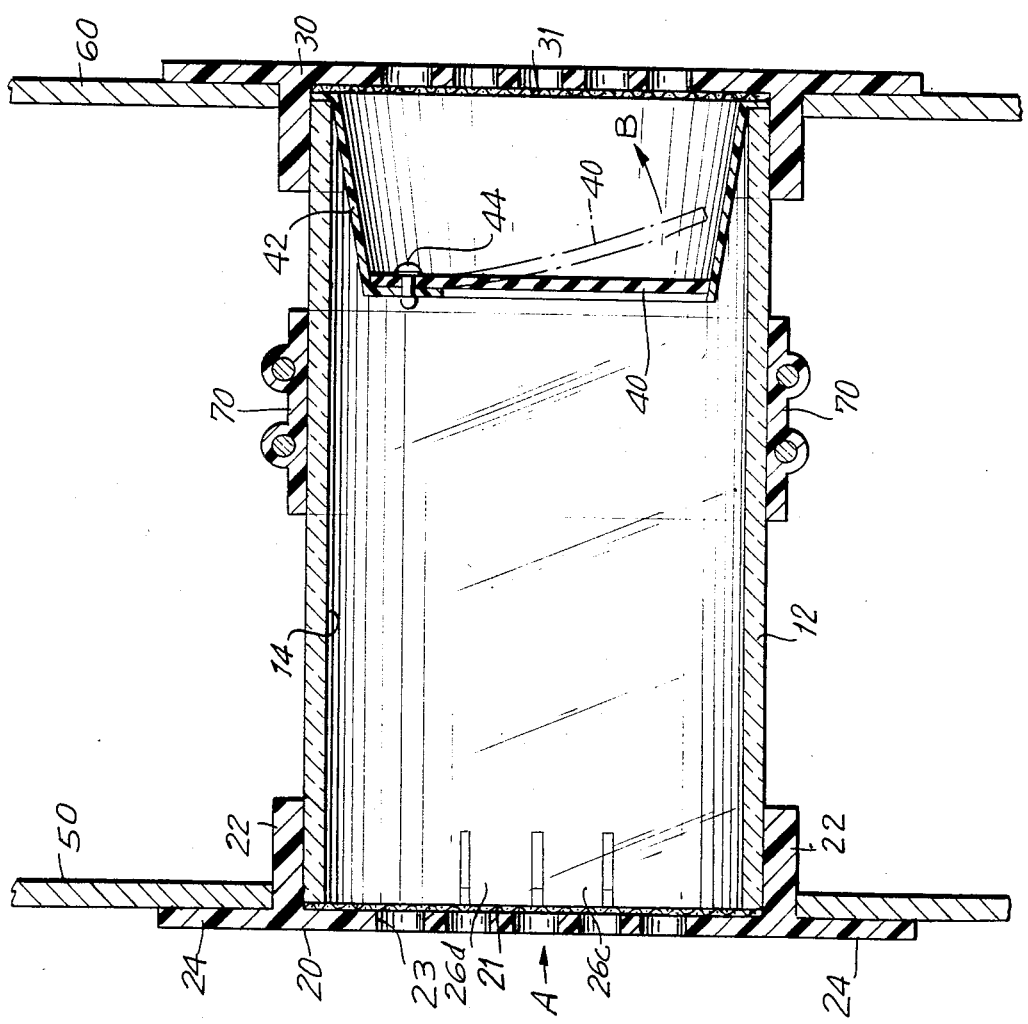
FIG. 3 is an enlarged sectional view taken along line 3—3 of FIG. 2.

As best depicted in FIG. 3, when the refrigerator door is closed, the excess pressure built-up within the enclosure will cause pressure in the direction of arrow A. Such pressure will cause diaphragm flap 40 to be deflected in the direction of arrow B. Similarily when the refrigerator door is open, the drop in pressure within the refrigeration enclosure will cause flap 40 to be deflected in the other direction to permit air to flow into the enclosure.

In order to prevent frost build-up in pressure relief port 10, pressure relief port 10 may include a heater coil 70 which can be coupled through leads 72 and 74 to an appropriate power source. By heating tube 12 through heater 70, frost build-up can be prevented.

The pressure relief port of the present invention provides a simple construction which is inexpensive to manufacture which obtains all of the benefits and advantages of the present invention. In particular, the flexible diaphragm flap is displacable between a first position where air flow through the port is essentially vented and a second position where the flap is moved away from its first position by the flow of air to permit air to flow thereto thereby providing equalization of pressure.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A pressure relief port for relieving the pressure within an enclosure having a wall with first and second sides and a first opening therethrough, comprising a tube having a conduit therethrough and sized to fit in said first opening in said wall to extend essentially intermediate said first and second sides of said wall, a first end cap having a second opening sized to fit on said first wall about said first opening, a second end cap having a third opening sized to fit on said second wall about said first opening, said tube extending into said first and second end caps, and flexible diaphragm means extending substanially across the conduit in said tube for regulating air flow, said diaphragm means having an edge and being pivotably displaceable at a position along said edge between a first position where said diaphragm means substantially closes off said conduit to air flow and a second position where said diaphragm means is displaced by air pressure to permit air flow through said conduit, whereby pressure on opposite sides of said wall is equalized.

2. The pressure relief port as claimed in claim 1, wherein said flexible diaphragm means includes an open cup positioned in said tube and a flexible diaphragm flap extending substantially across said cup to prevent random air flow.

3. The pressure relief port as claimed in claim 2, wherein said flap is rubber.

4. The pressure relief port as claimed in claim 1, wherein said first and second end caps each include a plurality of step catches adapted to permit said end caps to be coupled to different wall thicknesses.

5. The pressure relief port as claimed in claim 4, wherein said first and second end caps include screen means covering said second and third openings in said end caps to prevent impurities from flowing through said tube.

6. The pressure relief port as claimed in claim 1, wherein said tube includes heater means for preventing frost build up in said tube.

7. The pressure relief port as claimed in claim 2, wherein said tube includes heater means for preventing frost build up in said tube.

8. The pressure relief port as claimed in claim 7 wherein said cup is truncated.

9. The pressure relief port as claimed in claim 3, wherein said first and second end caps and said tube are plastic.

10. The pressure relief port as claimed in claim 6, wherein said heater means includes a heater coil surrounding said tube.

* * * * *